Jan. 4, 1949.  F. W. EDWARDS  2,457,880
DRIVE MEANS FOR COMPRESSORS OR THE LIKE
Filed July 31, 1944
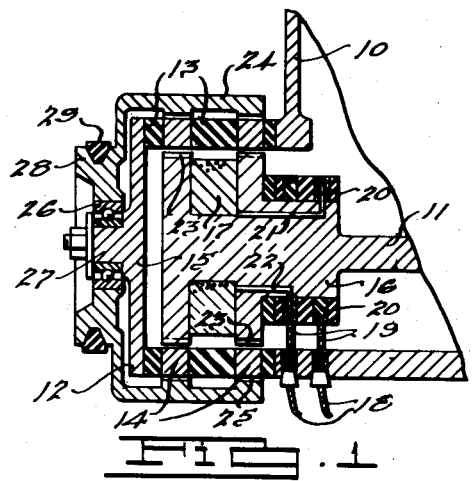
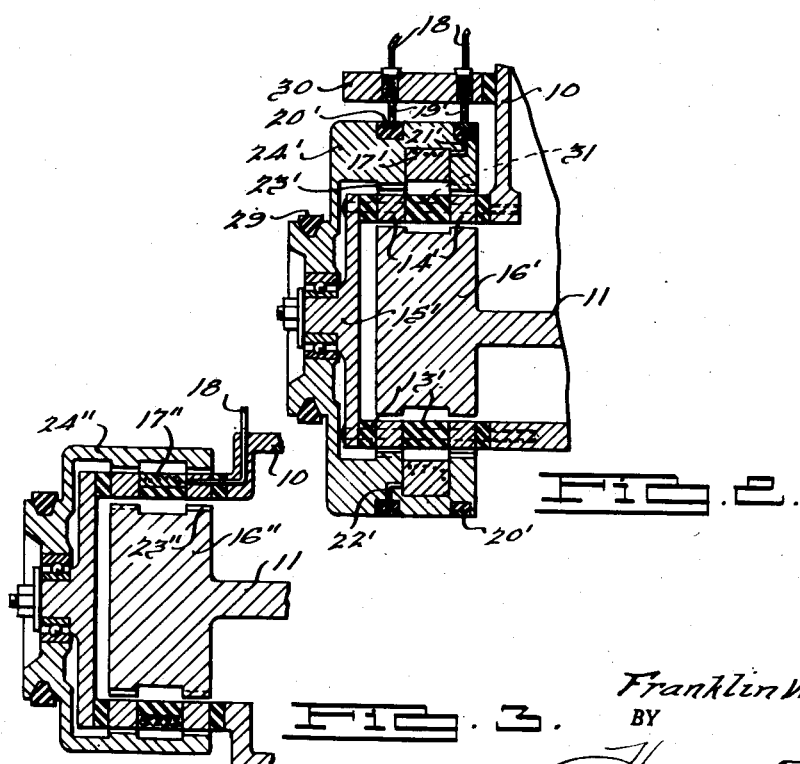
INVENTOR.
Franklin W. Edwards.
BY
ATTORNEYS Patented Jan. 4, 1949

2,457,880

UNITED STATES PATENT OFFICE 2,457,880

DRIVE MEANS FOR COMPRESSORS OR THE LIKE

Franklin W. Edwards, Detroit, Mich., assignor to Chrysler Corporation, Highland Park, Mich., a corporation of Delaware Application July 31, 1944, Serial No. 547,480

1 Claim. (Cl. 172—284)

This invention relates to driving mechanism for pumps, compressors, or the like. It is useful in any instance where it is necessary to drive a sealed or gas tight mechanism from an external power source.

Specifically, the invention is applied in the present instance to a compressor of the sealed type, such as is used in refrigerating apparatus.

Heretofore, these compressors have given considerable difficulty due to gas leakage around the bearing of the driving shaft. While expensive rotary seals are commonly used, gas does escape which requires replacement at regular intervals to maintain proper pressure.

It is the principal object of my invention to provide an improved driving connection between the compressor driving shaft and the power source which is one hundred per cent gas tight and which does not require the use of shaft seals, bellows, fluid seals, or the like.

Other objects and advantages will be apparent from the following description. In the drawing which accompanies the description, Fig. 1 is an elevational sectional view of my improved compressor driving mechanism.

Figs. 2 and 3 are similar views of modified forms of the invention.

Referring to Fig. 1 for the moment, it will be seen that I have shown a casing 10 which is adapted to house a compressor having an operating shaft 11. Inasmuch as the compressor details form no part of the invention, I have omitted them for the sake of clarity. It is believed sufficient to state that the shaft 11 is geared to or drives directly the pump, compressor or the like and that the driven mechanism is enclosed in a hermetically sealed casing 10.

The casing 10 has an annular extension 12 which has a number of annular non-magnetic sections 13 welded or otherwise secured to annular sections 14 of magnetic material. The joints between the alternate sections of magnetic and non-magnetic material are hermetically healed and an end plate 15 is fixed on the end of the section with a fluid and gas tight joint.

The drive shaft 11 has an enlarged section 16 of ferrous material which carries a field coil 17, mounted as shown. The coil 17 is energized through a pair of conductors 18 which are adapted to be connected to a source of electric power, such as a storage battery. The conductors are connected to a pair of brushes 19 which are mounted in the wall of casing 10 and which bear on slip rings 20 carried by the enlarged portion 16. The slip rings are carried in suitable insulating material 20 and are respectively connected with opposite ends of the coil 17 by means of conductors 21, 22.

Provided on the portion 16 adjacent the field coil 17 are teeth 23, two sets being provided, one on each side of the coil. The purpose of these teeth will be presently made clear.

The mechanism just described which is carried by the shaft 11 constitutes one element of an electromagnetic coupling of the eddy-current type. The other element is formed by an annular member 24 which has internal ring portions 25 disposed radially adjacent the magnetic casing portions 14, which in turn, are radially aligned with the teeth 23.

The member 24 is rotatably carried by a bearing 26 on a hub 27 formed on the end plate 15. Formed integrally on the number 24 is a pulley portion 28 which is adapted to receive a V-belt 29. The latter is driven by a source of power such as an electric motor, engine or the like.

When the field coil 17 is energized magnetic flux surrounds the coil and travels in a circular path through the teeth 23, the magnetic casing portions 14 and the member 24. Rotation of the member 24 by the power source causes alternate regions of high and low flux density to be set up in the member 24 because of the teeth 23, the flux from the coil tending of course to travel through the teeth where the air gap is shortest. These alternating regions of high and low flux density generate eddy currents in the members 16 and 24 which set up magnetic forces tending to oppose relative rotation between the members. The member 16 will therefore tend to rotate in unison with the driving element 24.

Because of the inherent "slip" between the elements 16 and 24 due to the unavoidable losses, the member 16 will never catch up with the driving element 24. However, the slip is relatively slight in a well designed coupling and the loss in drive efficiency negligible. The annular casing sections 14 of magnetic material decrease the effective air gap between the teeth 23 and portions 25, and the non-magnetic casing sections 14 act to confine the flux travel to a well defined path, all of which materially enhances the overall operating efficiency of the drive.

In Fig. 2, I have illustrated a modification of the above described arrangement which has advantages over the Fig. 1 form in certain installations because, among other things, no external-internal electrical connection is required. In Fig. 2, the brushes 19' are carried on an externally mounted support 30 and the field coil 17' is carried by the driving element 24' of the coupling instead of the driven element 16' thereof. Likewise, the outer element 24' carries the slip rings 29' which supply the coil through conductors 21', 22'.

The teeth 23' are positioned on the outer member, but the flux path is similar to that in Fig. 1. In Fig. 2, the non-magnetic section 13', the magnetic section 14' and the end plate 15' are all secured together and to the main casing 10 by means of a plurality of studs 31 of brass or similar non-magnetic material. The studs 31 are drawn up tight to provide a gas tight joint and if necessary, some form of adhesive sealing compound may be used to seal the joints between sections.

In Fig. 3, the coil 17" is carried by the casing itself, the teeth 23" being disposed on the driven member 16". The teeth could be located on the driving member 24" if desired. The operation of the Fig. 3 coupling is identical with that of Figs. 1 and 2.

The Fig. 3 form is preferable in many installations because of its simplicity, particularly with respect to the problem of energizing the field coil 17". The coil is stationary and is readily supplied with current through wires 18 without the necessity of slip rings or brushes.

It will thus be seen that I have provided a simple and economically constructed drive for sealed units which is absolutely fluid tight. While I have illustrated preferred embodiments of my invention, I wish it understood that it is not intended to limit the scope of the invention in its broader aspects except as set forth in the appended claim.

I claim:

In an electromagnetic drive means for a compressor or the like, a hermetically sealed casing for the compressor having a cylindrical portion extending therefrom constructed of alternately disposed rings of magnetic and non-magnetic material; an end plate for closing the end of the said extending casing portion, and a plurality of non-magnetic studs disposed axially of said rings for securing said rings and plate together in fluid tight relation.

FRANKLIN W. EDWARDS.

REFERENCES CITED

The following references are of record in the file of this patent:

UNITED STATES PATENTS

| Number | Name | Date |
| --- | --- | --- |
| 762,620 | Eastwood | June 14, 1904 |
| 1,221,295 | Dopkins | Apr. 3, 1917 |
| 1,271,401 | Weydell | July 2, 1918 |
| 1,308,435 | Maine | July 1, 1919 |
| 1,422,243 | VanNorden | July 11, 1922 |
| 1,911,960 | Lipman | May 30, 1933 |
| 1,917,760 | Geiger | July 11, 1933 |
| 2,131,035 | Deechlyn | Sept. 27, 1938 |